March 21, 1967 W. O. WESSELER Re. 26,175

CABLE HANGERS

Original Filed Aug. 29, 1955 2 Sheets-Sheet 1

INVENTOR.
William O. Wesseler
BY George Sipkin
Paul H. Gadsby
ATTORNEYS

CABLE HANGERS

Original Filed Aug. 29, 1955 2 Sheets-Sheet 2

INVENTOR.
William O. Wesseler
BY George Sipkin
Paul W. Fitzpatrick
ATTORNEYS

United States Patent Office

Re. 26,175
Reissued Mar. 21, 1967

26,175
CABLE HANGERS

William O. Wesseler, Rte. 5, Box 970,
Bremerton, Wash. 98310

Original No. 2,939,664, dated June 7, 1960, Ser. No. 531,208, Aug. 29, 1955, which is a continuation of reissue application Ser. No. 155,891, filed Nov. 27, 1961. Application for reissue Jan. 29, 1965, Ser. No. 445,294
17 Claims. (Cl. 248—68)

Figure 2:
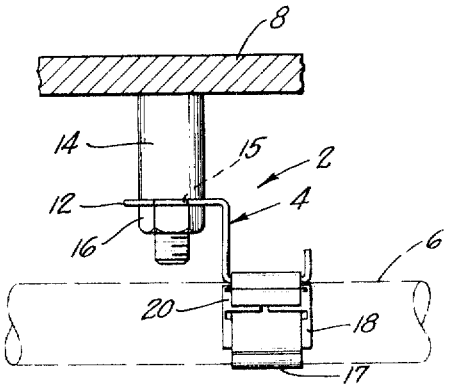

Matter enclosed in heavy brackets [ ] appears in the original patent but forms no part of this reissue specification; matter printed in italics indicates the additions made by reissue.

*This application is a reissue application for the reissue of Patent No. 2,939,664, and a continuation of reissue application Serial No. 155,891, filed November 27, 1961, now abandoned.*

This invention relates to supports and more particularly to hangers for supporting cables, pipes, conductors, ducts and the like a spaced locations on buildings, vehicles, ships and other installations subject to shock.

As would be expected, numerous types of hangers have been proposed for supporting a single cable or group of cables to bulkheads or overheads in naval vessels. One of the most common hanger constructions presently in use on most of these installations consists of a saddle on which is supported a plurality of laterally disposed cables secured thereto by a strap that is preformed in contour to correspond to the combined outer periphery of the particular cable grouping so that each cable will be snugly clamped to the saddle. The strap extends for substantially the length of the saddle and terminates in lug portions which are usually bolted, together with the saddle, to a post fixed to a supporting structure. Although the cables in any grouping all may be of the same diameter, they usually vary.

It has been found that when these conventional hangers are subjected to shock conditions, the straps which have an undulating shape to conform to the peripheral contour of the cables have a tendency to straighten, releasing the assembled cables and causing chattering. To combat this effect, the straps must be made of thick rigid material to withstand the shock. In addition to the foregoing operational deficiencies, certain manufacturing limitations are present in that the straps must be fabricated to order depending on the exact cable measurements and disposition. As cable arrangements usually vary considerably throughout the sections of a ship, it is apparent that many manufacturing steps are involved and that a variety of straps must be stocked to satisfy the demand, especially since interchangeability of straps is impossible in most instances. Furthermore, thick straps are usually formed by die stamping which requires costly die sets and involves the employment of heavy presses.

Accordingly, a principal object of this invention is to provide a hanger capable of withstanding heavy shock loading, and which is sufficiently rigid but yieldable to distribute the shock throughout the hanger.

Another object is to provide a hanger which has greater versatility in accommodating different sizes and arrangements of cables and the like and which will eliminate the need for large and costly inventories.

Still other objects are to provide a hanger which will effect a reduction in weight without a sacrifice of strength; to provide a hanger capable of expediting and reducing installation costs by permitting use of commercially available banding tools; and to provide a hanger which is less expensive to construct, install and maintain.

These and other objects will be apparent from the detailed description and accompanying drawing.

The foregoing objects are generally achieved by the provision of a hanger that employs a flexible clamping member, preferably of band material, capable of being looped completely around both the objects to be supported, such as a single cable or group of cables, and the support. The looped band can be simply and expeditiously tensioned by a commercially available banding tool and the ends of the band secured in such condition by a suitable buckle.

Another important feature of the invention resides in the construction of a cable-supporting saddle member capable of withstanding shock, such as may arise from gun concussion or collision. The saddle is preferably stamped of sheet metal into a channel configuration having a base portion and spaced opposing flange portions between which the looped band is laterally restrained. The cables or the like are transversely clamped against the exterior surface of the channel base by the tensioned band. In one form of the invention, the saddle is suspended from a supporting structure by a standard or stud which is detachably secured to a lug or ear projecting from at least one of the saddle flanges, the lug extending substantially parallel to the base and in a direction longitudinally along the cables such that the saddle can be supported from one or both of its sides. Thus, in a single cable row installation the saddle can be suspended from a medial position between its ends to increase the effective cable-supporting length. In installations requiring multiple spaced cable rows, the same saddle construction may be employed but supported from standards positioned at the saddle ends. However, in both installations the standards are laterally offset from the saddle base to enable the band to be longitudinally looped around the saddle and the cables without interfering with the standards. When the saddle is of a length requiring more than one point of suspension, two lugs may be provided, one extending from each flange in opposite directions and at opposite ends of the saddle. Thus the saddle is rigidly supported by the lugs from an offset position which will tend to absorb and distribute the force of heavy shocks.

Figure 1:
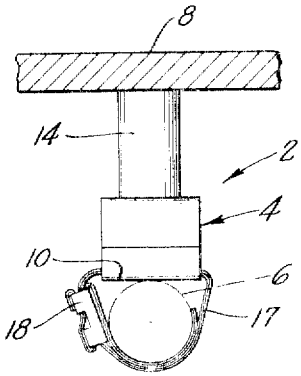
Figure 3:
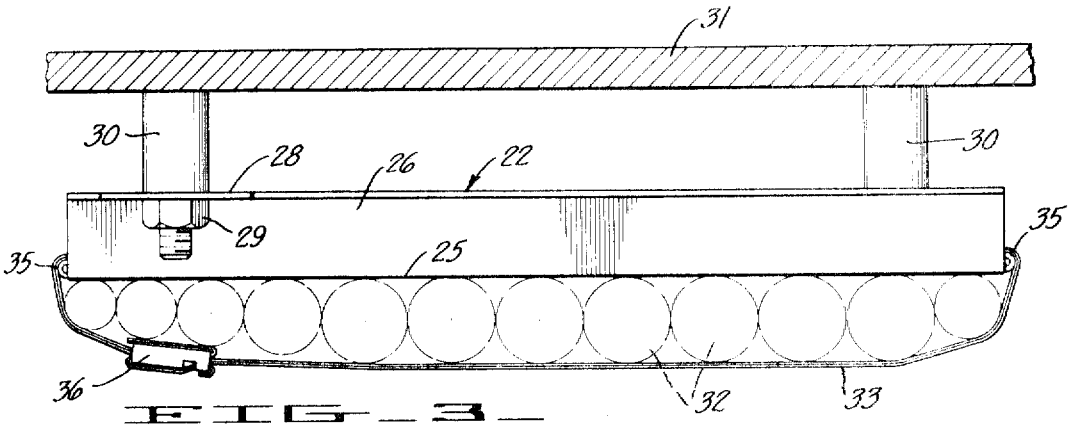
Figure 4:
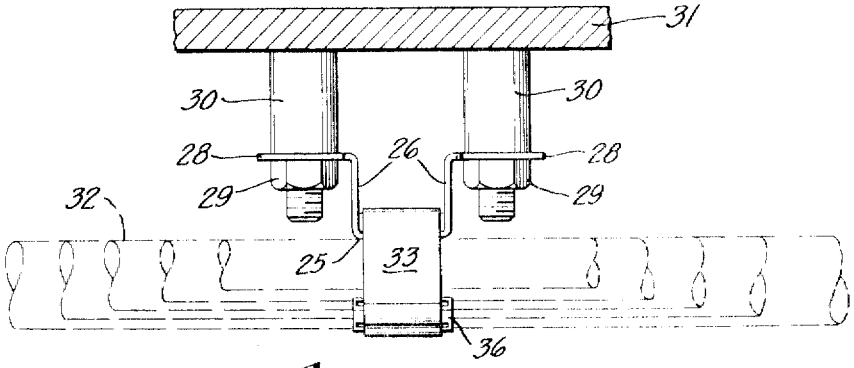
Figure 5:
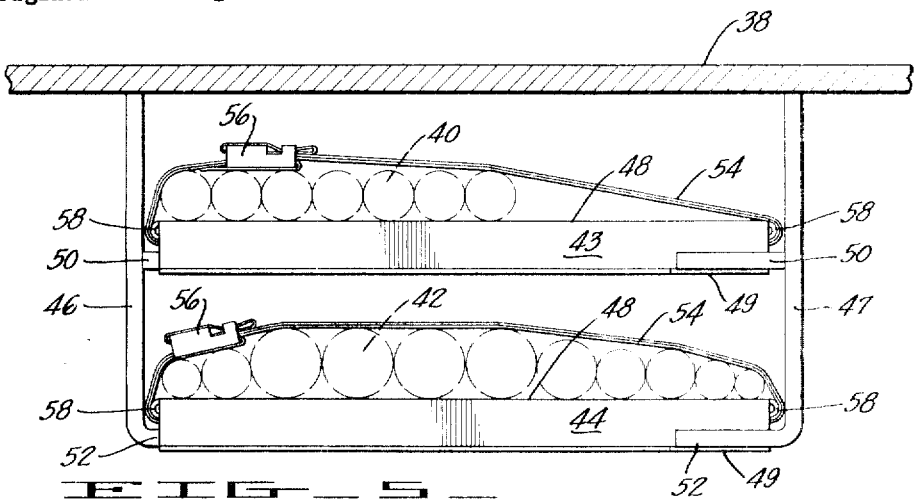
Figure 6:
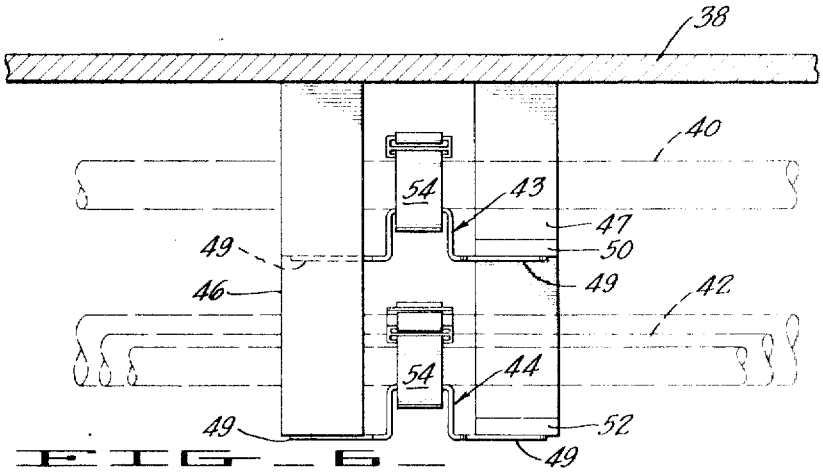

In the drawings, FIGS. 1 and 2 are end and side elevations, respectively, of a hanger asembly suitable for supporting a single cable to a structure; FIGS. 3 and 4, end and side elevations of a modified hanger assembly for supporting a single row of cables; FIGS. 5 and 6, end and side elevations of another modified hanger assembly for supporting multiple cable rows; and FIG. 7, a plan view of a developed saddle blank of a type employed in FIGS. 3 to 6, inclusive, prior to the bending operation.

Referring to FIGS. 1 and 2 in the drawing, reference numeral 2 generally indicates a hanger comprising a saddle 4 capable of supporting a cable 6 or the like to a structure 8, such as a ship's deck or bulkhead. Saddle 4 is preferably stamped of sheet metal into a generally channel-shaped configuration, providing a base 10 transversely positioned against cable 6 transversely positioned One leg of the channel is formed into an attaching lug or ear 12 which extends outwardly of the channel portion and generally parallel to the cable. This construction enables the entire length of saddle 4 to be available for supporting the cable, or a cable row as will be more apparent in the following modifications, which can be a space-saving factor in confined installations.

Saddle 4 is suspended from structure 8 by a standard 14, such as a spot-welded stud, lug 12 being apertured at 15 to receive a threaded end of the stud, this end being adapted to receive a nut 16 for securing the lug. Lug 12 is sufficiently offset over the cable to accommodate the stud end and the nut. Functionally, this lug is important since it has sufficient rigidity to support the cables but is capable of bending under heavy shock, such as may be caused by a collision, to distribute the stress without releasing the cables.

Another important feature of the hanger includes a novel manner for securing the cable to the saddle. A flexible clamping member, preferably a band 17, is looped around both saddle 4 and cable 6 and tensioned by any appropriate commercially available banding tool (not shown).

It should be noted that the offset construction of lug 12, in addition to providing a maximum saddle length for supporting the cable, also enables band 17 to pass freely around and hug the ends of the saddle without interference by the standard. Furthermore, by wrapping the band completely around both the cable and the saddle an improved ground connection is assured when R.F. cables are involved. Band 17 can be strung between the flanges of the channel which restrains the band from lateral movement during and after tensioning, the ends of the band being secured in this condition by any suitable clip or buckle 18. Improved anchoring of the band is obtained by assuring that the inner end contacts at least one of the cables being supported or a part of the saddle. After being threaded through the buckle, the outer end of the band is either folded under or over buckle tabs 20. Using a Band-It type of tool, it has been found that the tension applied to the banding material during installation generally should not exceed 1½ pounds foot torque on the tool.

It is obvious that saddle 4 can be made of any length to accommodate various groupings of adjacent cables in a row, however, from a structural consideration, it is desirable for large [cable groupings] *groups of cables or other elongated members* to furnish additional support to the saddle as presently described.

Figure 7:
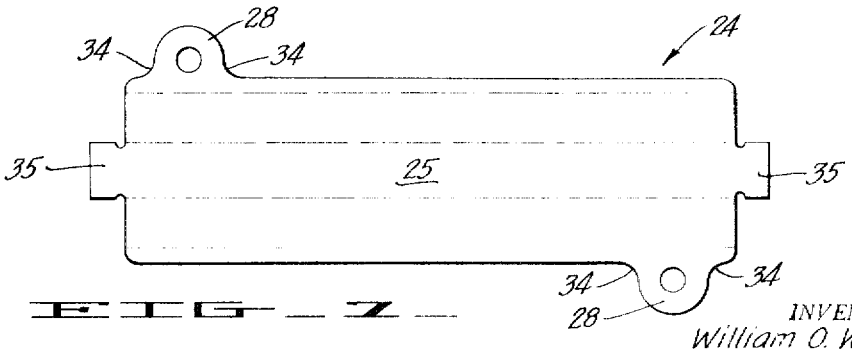

The hanger modification illustrated in FIGURES 3 and 4 is designed for supporting a wider grouping of cables than is suitable in the embodiment of FIGURES 1 and 2 and has the same basic construction. A saddle 22 of this modification is *an elongate hollow or tubular member* fabricated from a flat sheet metal blank 24, as shown in FIGURE 7, into a channel construction having *side walls forming* a base portion 25 and two spaced opposing [leg] *flange* portions 26. Two lugs 28 laterally project from the free [ends] *edges* of the [legs] *flanges* and are suitably secured by nuts 29 to standards 30 which are welded to or otherwise mounted on a structure 31. As in the prior modification, lugs 28 extend from the [sides of the] saddle [legs] *flanges* longitudinally of cables 32 to provide a more compact assembly in that the cables can be strung directly under their support, this arrangement making available, if needed, the entire length of the saddle to support the cable grouping. As before, the lugs are offset from base 25 to provide space for nuts 29 and to permit a flexible [band 33] *strip 33 of band material* to be looped around both the cables and the [ends] *base portion 25* of the saddle without interference. Normally, two lugs are needed for wide cable groupings, preferably one projecting from each channel [leg] *flange* in opposed directions. This arrangement necessitates the employment of only two standards, in staggered relation as are the lugs, and makes it possible for the saddle to bend or deflect so that the stresses can be more evenly distributed along its length and not concentrated at any one supporting standard.

Referring to FIGURE 7, the corners of lugs 28 and the saddle blank are formed with a suitable radius at 34 to discourage tearing when subjected to shock conditions. Each end of the channel *side wall 25* is provided with a lip 35 which is rolled over in the fabricating process to avoid sharp edges or small radius bends that might shear the tensioned band.

Whereas, one loop of the banding material may be suitable for clamping a single cable as in the embodiment of FIGS. 1 and 2, it is advisable, when supporting a plurality of cables, to double the loop of banding material, the ends being fastened by a buckle 36 which may be the same as buckle 18. In the event the cables to be supported are of different diameters, the largest should be positioned in the middle of the group and the smaller ones at the sides in graduated sequence in order that as many cables as possible can be snugly engaged by the band.

FIGS. 5 and 6 illustrate a third embodiment of a hanger assembly adapted to support multiple row or stacked cable runs and differing from the prior embodiments primarily in the manner of suspending the cables from a structure 38. This cable groups 40 and 42 rest on saddles 43 and 44 which are supported in superimposed spaced relation by standards 46 and 47 laterally disposed at the saddle ends. Whereas the single cable row of FIGS. 1 to 4 can be supported to advantage from a point directly over the cables, such an arrangement is obviously impractical in installations requiring two or more superimposed cable rows. Saddles 43 and 44 may be identical in construction to saddle 22 and similarly fabricated from blank 24 of FIG. 7. However, saddles 43 and 44 are supported in an inverted position from the previously described embodiments to the extent that each cable run rests on top of its respective channel portion 48 rather than being suspended from beneath the saddles by the bands as in FIGS. 1 to 4.

Saddles 43 and 44 are disposed in the same relation, one above the other, so that the respective saddle lugs 49 on each side can be welded or otherwise secured to upper and lower horizontal extensions 50 and 52 of the standards. As can be observed in FIG. 6, standards 46 and 47 are staggered to the same extent as lugs 49, standard 46 being foremost and standard 47 being rearmost.

As in the other modifications, the cables are clamped to their respective saddle by a looped band 54 the ends of which are tensioned around both the cables and saddle by a suitable banding tool and secured together by a buckle 56. Band 54 is laterally restrained on the saddle between the flanges of channel portions 48 and is protected against shearing by rolled lips 58 at the saddle ends.

Hangers constructed in accordance with the invention offer many advantages. The hangers are more universal in use in that one size can accommodate a wide variety of different cable groupings thereby eliminating the need for custom made straps and the many manufacturing preliminaries that are incident thereto. By providing laterally projecting lugs, the saddle in a single row installation can be supported by a standard disposed intermediate the saddle ends, and between the cables and the structure for providing a more compact assembly. In multiple row installations the same saddle can be employed and supported in tiers from standards positioned at the saddle ends. The saddles are less expensive to manufacture as they can be stamped of sheet metal being lighter in weight and capable of bending under severe shock to distribute the stress. Equally advantageous is the utilization of a flexible clamping band that can be tensioned about both the saddle and the cables supported thereto by commercially available banding tools, a factor which greatly reduces costs by expediting the work of both new installations and alterations. In addition a superior electrical grounding of the cables is achieved by using a looped metal band.

Obviously, many modifications and variations of the present invention are possible in the light of the above teachings. It is, therefore, to be understood that within the scope of the appended claims the invention may be practiced otherwise than as specifically described.

I claim:

1. A shock absorbing hanger apparatus adapted for supporting elongated pipes and cables comprising in combination a channel having a base portion *with a substantially flat external surface adapted to be engaged by such*

*pipes and cables* and a pair of spacially disposed flange portions integrally connected to said base portion in angular relationship therewith, a laterally offset ear angularly projecting from at least one of said pair of flange portions, an aperture disposed in said ear, structural mounting means, means interconnecting said structural mounting means and said laterally offset ear for fastening same thereto at said aperture, a *flat unpreformed* flexible band looped completely around both the base portion of said channel between the flange portions thereof and the aforesaid elongated pipes and cables being supported, and means connected to said band for binding together the ends thereof and causing said band to be tensioned about said pipes, cables, and channel, whereby said pipes and cables [and said channel] are securely and conjointly clamped *to said substantially flat external surface of said channel base portion* for support thereby.

2. A shock absorbing hanger apparatus adapted for supporting elongated pipes and cables comprising in combination a substantially L-shaped channel having a base portion *with a substantially flat external surface adapted to be engaged by such elongated pipes and cables* and a pair of spacially disposed flange portions, one of which is longer than the other, integrally connected to said base portion in angular relationship therewith, a laterally offset lug angularly projecting from the longer one of said pair of spacially disposed flange portions, a structural mounting member, means interconnecting said structural mounting member and said laterally offset lug for fastening same thereto, a *flat unpreformed* flexible band looped completely around both the base portion of said channel between the flange portions thereof and the aforesaid elongated pipes and cables being supported, and means connected to said band for binding and tensioning same about said pipes, cables, and channel, whereby said pipes and cables [and said channel] are securely clamped [together] *to said substantially flat external surface of said channel base portion* for support thereby in noninterfering relationship with said structural mounting member and the aforesaid means interconnecting said structural mounting member and said laterally offset lug.

3. A shock absorbing hanger apparatus adapted for supporting elongated pipes and cables comprising in combination a substantially U-shaped channel having a base portion and a pair of spacially disposed flange portions integrally connected to said base portion in angular relationship therewith, a first laterally offset lug projecting outwardly from one of said pair of spacially disposed flange portions, a second laterally offset lug projecting from the other of said pair of spacially disposed flange portions in a direction opposite that of the direction of projection of said first laterally offset lug, structural mounting means, means respectively interconnecting said structural mounting means and said first and second laterally offset lugs for fastening same thereto, a flexible band looped completely around both the base portion of said channel between the flange portions thereof and the aforesaid elongated pipes and cables being supported, and buckle means connected to said band for latching together the ends thereof and causing said band to be tensioned about said pipes, cables, and channel base, whereby said pipes and cables [and said channel] are securely and conjointly clamped for support thereby in noninterfering relationship with said structural mounting means and the aforesaid means respectively interconnecting said structural mounting means and said first and second laterally offset lugs.

*4. A hanger for compressively banding and supporting a cable run, said hanger comprising an elongate planar metal hollow member of uniform rectilinear cross section throughout its length, said member being adapted to extend transversely to the axis of said cable run and having one of its external planar side wall surfaces adapted to supportably engage cables of the run, said external side wall surface having a length approximately equal to the combined diameters of laterally-adjacent cables of the run, a length of continuously flat unpreformed flexible metal band extending axially through said hollow member and completely encircling said run, band clamping means for securing together the ends of said band length, said clamping means being formed to permit tensioning of the band about the cable run whereby said band is drawn into parallel relationship to the interior surface of said side wall and said cable run is compressively bound to its said external surface, and partable hanger attachment means having one of its parts carried by another side wall of said hollow member, and another of its parts adapted to be integrally secured to external hanger supporting structure.*

*5. The hanger of claim 4 wherein said hollow member side wall has rolled end portions for minimizing band breakage.*

*6. A hanger for supporting a group of elongated members banded to the hanger in substantially parallel relationship, such hanger comprising an elongate hollow member of substantially uniform cross section throughout its length, said member being adapted to extend transversely of the length of the elongated members of such group and having a side wall with a substantially flat external surface adapted to be engaged by such group of elongated members, such group-engaged side wall surface having a length approximately equal to the combined widths of the elongated members of such group engaged with such side wall surface, a strip of flat unpreformed flexible band material extending through said hollow member lengthwise thereof and completely encircling such group of elongated members, strip clamping means securing together the ends of said strip of band material tensioned about the group of elongated members and holding its members close to said hollow member, and partable hanger attachment means having one of its parts carried by a side wall of said hollow member other than that engaged by the group of elongated members, and adapted to be secured to hanger supporting structure.*

*7. A hanger for supporting a group of elongated members banded to the hanger in substantially parallel relationship, such hanger comprising an elongate hollow member adapted to be disposed with its length extending transversely of the lengths of the elongated members of such group and having a side wall with a substantially flat external surface adapted to be engaged by such group of elongated members, a strip of flat unpreformed flexible band material extending through said hollow member lengthwise thereof and completely encircling such group of elongated members and hollow member side wall engaged thereby, strip clamping means securing said strip of band material in a closed loop tensioned about the group of elongated members and the hollow member side wall engaged thereby and holding the group members close to said hollow member, and hanger attachment means connected to a portion of said hollow member other than its side wall engaged by the group of elongated members and adapted to be secured to hanger supporting structure.*

*8. Hanger apparatus adapted for supporting an elongated member, comprising an angle having a substantially flat base portion and a flange integrally connected to said base portion and projecting from one side thereof in angular relationship thereto, an ear projecting angularly from said flange and having an aperture therein, structural mounting means, means interconnecting said structural mounting means and said ear and extending through the aperture thereof, flat unpreformed flexible band means looped completely around both the base portion of said angle and such elongated member being supported and including means for tensioning said band means circumferentially to hold the elongated member firmly to said angle, and retaining means spaced from said flange and projecting from the same side of said base portion as said flange projects to retain said flat unpreformed flexible band means between said retaining means and said flange.*

*9. A hanger for supporting an elongated member, comprising a hollow member having substantially flat walls, a first one of said walls having its external surface engaged by such elongated member, and a second one of said walls being joined to a first edge of said first wall and extending substantially throughout the length of said first edge substantially perpendicular to said first wall and disposed substantially perpendicular to the length of the elongated member engaged with said first wall, securing means extending through the hollow of said hollow member over the interior of said first wall and across second and third edges thereof and completely encircling such elongated member, said securing means including a strip of flat unpreformed flexible band material and strip clamping means for tensioning said securing means in a closed loop encircling the elongated member and said first wall of said hollow member engaged therewith, and hanger attachment means connected to said hollow member and adapted to be secured to hanger supporting structure.*

*10. A hanger for supporting an elongated member, comprising a hollow member having substantially flat walls, a first one of said walls having its external surface engaged by such elongated member, and a second one of said walls being joined to a first edge of said first wall and extending substantially throughout the length of said first edge and substantially perpendicular to said first wall, securing means extending through the hollow of said hollow member over the interior of said first wall and across second and third edges thereof and completely encircling such elongated member, said securing means including a strip of flat unpreformed flexible band material and strip clamping means for tensioning said securing means in a closed loop encircling the elongated member and said first wall of said hollow member engaged therewith, and hanger attachment means connected to said hollow member and adapted to be secured to hanger supporting structure.*

*11. A hanger for supporting an elongated member, comprising a hollow member having substantially flat walls, a first one of said walls having its external surface engaged by such elongated member, and a second one of said walls being joined to a first edge of said first wall and extending substantially throughout the length of said first edge and substantially perpendicular to said first wall, securing means extending through the hollow of said hollow member over the interior of said first wall and across second and third edges thereof and completely encircling such elongated member, said securing means including a strip of flat unpreformed flexible band material and strip clamping means for tensioning said securing means in a closed loop encircling the elongated member and said first wall of said hollow member engaged therewith, said second and third edges of said hollow member being curved for engagement by said strip in directions substantially tangential to such curvature at each side of each said edge, and hanger attachment means connected to said hollow member and adapted to be secured to hanger supporting structure.*

*12. A hanger for supporting an elongated member banded to the hanger, such hanger comprising an elongate structure adapted to be disposed with its length extending transversely of the length of the elongated member and having a first substantially flat wall which is engaged by such elongated member and a second wall joined to said first wall, extending substantially throughout the length of said first wall and projecting substantially perpendicular to said first wall from one side thereof and substantially perpendicular to the length of the elongated member, a strip of flat unpreformed flexible band material encircling such elongated member and extending over the side of said first wall opposite the elongated member, strip clamping means securing said strip of band material in a closed loop tensioned about the elongated member and said first wall and holding the elongated member close to said first wall, means connected to said elongate structure for supporting it, and retaining means spaced from said escond wall and projecting from the same side of said first wall as said second wall projects to retain said strip of flat unpreformed flexible band material between said retaining means and said second wall.*

*13. A hanger for supporting a group of elongated members banded to the hanger in substantially parallel generally coplanar relationship, such hanger comprising an elongate structure adapted to be disposed with its length extending transversely of the lengths of the elongated members of such group and having a first substantially flat wall which is engaged by such group of elongated members and a second wall joined to said first wall, extending substantially throughout the length of said first wall and projecting substantially perpendicular to said first wall from one side thereof and substantially perpendicular to the length of the elongated members, a strip of flat unpreformed flexible band material encircling such group of elongated members and extending over the side of said first wall opposite the elongated members, strip clamping means securing said strip of band material in a closed loop tensioned around the group of elongated members and said first wall and holding the group of elongated members close to said first wall, means connected to said elongated structure for supporting it, and retaining means spaced from said second wall and projecting from the same side of said first wall as said second wall projects to retain said strip of flat unpreformed flexible band material between said retaining means and said second wall.*

*14. A hanger for compressively banding and supporting a cable run, said hanger comprising an elongate planar metal hollow member of uniform rectilinear cross section throughout its length, said member being adapted to extend transversely to the axis of said cable run and having one of its external planar side wall surfaces adapted to supportably engage cables of the run, said external side wall surface having a length approximately equal to the combined diameters of laterally-adjacent cables of the run, a length of continuously flat unpreformed flexible metal band extending axially through said elongate hollow member and completely encircling said run, band clamping means for securing together the ends of said band length, said clamping means being formed to permit tensioning of the band about the cable run whereby said cable run is compressively bound to said external side wall surface, and partable hanger attachment means having one of its parts carried by another side wall of said elongate hollow member, and another of its parts adapted to be intergrally secured to external hanger supporting structure.*

*15. The hanger of claim 14 wherein the hollow member side wall having the external planar surface adapted to be supportedly engage cables of the run has rolled end portions for minimizing band breakage.*

*16. The hanger of claim 4 wherein the hollow member side wall having the external planar surface adapted to be supportedly engage cables of the run has rolled end portions for minimizing band breakage.*

*17. A shock absorbing hanger apparatus adapted for supporting elongated pipes and cables comprising in combination a substantially U-shaped channel having a base portion with a substantially flat external surface adapted to be engaged by such elongated pipes and cables and a pair of spacially disposed flange portions integrally connected to said base portion in angular relationship therewith, a first laterally offset lug projecting outwardly from one of said pair of spacially disposed flange portions, a second laterally offset lug projecting from the other of said pair of spacially disposed flange portions in a direction opposite that of the direction of projection of said first laterally offset lug, structural mounting means, means respectively interconnecting said structural mounting means and said first and second laterally offset lugs for fastening same thereto, a flat unpreformed flexible band looped completely around both the base portion of said channel between the flange portions thereof and the afore-*

*said elongated pipes and cables being supported, and buckle means connected to said band for latching together the ends thereof and causing said band to be tensioned about said pipes, cables, and channel base, whereby said pipes and cables [and said channel] are securely and conjointly clamped to said substantially flat external surface of said channel base portion for support thereby in noninterfering relationship with said structural mounting means and the aforesaid means respectively interconnecting said structural mounting means and said first and second laterally offset lugs.*

References Cited by the Examiner

The following references, cited by the examiner, are of record in the patented file of this patent and the original patent.

UNITED STATES PATENTS

| | | | |
|---|---|---|---|
| 1,225,525 | 5/1917 | Sweet | 248—300 |
| 1,232,674 | 7/1917 | Fork | 24—21 |
| 1,524,141 | 1/1925 | Kyle | 248—67.7 X |
| 1,882,555 | 10/1932 | Gray | 248—74 |
| 2,214,109 | 9/1940 | Ott | 24—23 |
| 2,438,362 | 3/1948 | Dunkelberger | 248—74 X |
| 2,535,427 | 12/1950 | Kindorf | 248—68 |
| 2,560,845 | 7/1951 | Carpenter et al. | 248—58 |
| 2,567,463 | 9/1951 | Atkinson | 248—68 |
| 2,623,760 | 12/1952 | Fornelius | 248—361 |
| 2,682,384 | 6/1954 | Eichelberger | 248—68 |
| 2,726,838 | 12/1955 | Ripley | 248—361 |

FOREIGN PATENTS

| | | |
|---|---|---|
| 774,591 | 9/1934 | France. |

CLAUDE A. LEROY, *Primary Examiner.*